United States Patent
den Besten

(10) Patent No.: US 11,010,323 B2
(45) Date of Patent: May 18, 2021

(54) APPARATUSES AND METHODS INVOLVING DISABLING ADDRESS POINTERS

(71) Applicant: NXP B.V., Eindhoven (NL)

(72) Inventor: Gerrit Willem den Besten, Eindhoven (NL)

(73) Assignee: NXP B.V., Eindhoven (NL)

( * ) Notice: Subject to any disclaimer, the term of this patent is extended or adjusted under 35 U.S.C. 154(b) by 0 days.

(21) Appl. No.: 16/457,287

(22) Filed: Jun. 28, 2019

(65) Prior Publication Data

US 2020/0409884 A1 Dec. 31, 2020

(51) Int. Cl.
*G06F 13/42* (2006.01)
*G06F 13/40* (2006.01)

(52) U.S. Cl.
CPC ............ *G06F 13/404* (2013.01); *G06F 13/42* (2013.01); *G06F 2213/0052* (2013.01)

(58) Field of Classification Search
None
See application file for complete search history.

(56) References Cited

U.S. PATENT DOCUMENTS

| | | | |
|---|---|---|---|
| 5,598,545 A * | 1/1997 | Childers | G06F 9/3004 712/221 |
| 5,603,013 A * | 2/1997 | Ohara | G06F 15/8015 386/327 |
| 6,215,816 B1 | 4/2001 | Gillespie et al. | |
| 7,511,530 B1 | 3/2009 | Cox et al. | |
| 8,631,483 B2 * | 1/2014 | Soni | G06F 9/3001 726/13 |
| 9,083,784 B2 * | 7/2015 | Ku | H04M 7/0024 |
| 9,455,713 B1 | 9/2016 | Kadkol | |

(Continued)

FOREIGN PATENT DOCUMENTS

JP 2015 035780 A 2/2015

OTHER PUBLICATIONS

IEEE Standard for Ethernet, IEEE 802.3-2018, Clauses 22 and 45 (abstract only).

(Continued)

*Primary Examiner* — Cheng Yuan Tseng
(74) *Attorney, Agent, or Firm* — Rajeev Madnawat

(57) ABSTRACT

An apparatus in various embodiments is for use in a local area network and includes a discernment logic circuit and logic circuitry. The discernment logic circuit discerns whether a requested communications transaction received over the management communications bus from another of the logic nodes involves a first type of transaction or a second type of transaction, the second type of transaction having a plurality of commands associated with the requested communications transaction to convey respectively different parts of the requested communications transaction including an address part and a data part. The logic circuitry disables, in response to a reset of an address pointer in the one of the plurality of logic nodes and the requested communications transaction being the second type of transaction, the address pointer to mitigate a likelihood that the requested communications transaction is performed via the communication protocol while the address pointer for the second type of transaction is erroneous.

20 Claims, 2 Drawing Sheets

(56) References Cited

U.S. PATENT DOCUMENTS

| | | | |
|---|---|---|---|
| 10,747,538 B2* | 8/2020 | Mouchel La Fosse | ....................... G06F 9/3836 |
| 2002/0124007 A1* | 9/2002 | Zhao | ....................... H04L 67/12 |
| 2011/0096930 A1* | 4/2011 | Walmsley | ............. H04L 9/0662 380/278 |
| 2013/0002290 A1 | 1/2013 | Gondi et al. | |
| 2013/0106491 A1 | 5/2013 | Ryu | |
| 2014/0181845 A1 | 6/2014 | Jing et al. | |
| 2019/0104088 A1 | 4/2019 | Qin et al. | |
| 2019/0205244 A1 | 7/2019 | Smith | |
| 2019/0361708 A1 | 11/2019 | Soe et al. | |
| 2020/0201637 A1 | 6/2020 | Mouchel La Fosse et al. | |
| 2020/0272474 A1 | 8/2020 | Gabor et al. | |
| 2020/0409706 A1 | 12/2020 | den Besten | |
| 2020/0409976 A1 | 12/2020 | den Besten | |
| 2020/0412368 A1 | 12/2020 | den Besten | |
| 2020/0412572 A1 | 12/2020 | den Besten | |

OTHER PUBLICATIONS

Open Alliance, TC10 Wake-up and Sleep Specification for Automotive Ethernet.

Yue Lu, Kwangmo Jung, Yasuo Hidaka, Elad Alon, "Design and Analysis of Energy-Efficient Reconfigurable Pre-Emphasis Voltage-Mode Transmitters," in IEEE Journal of Solid-State Circuits, vol. 48, No. 8, Aug. 2013 (abstract only).

Non-Final Rejection for U.S. Appl. No. 16/456,111, 15 pgs. (dated Aug. 24, 2020).

U.S. Appl. No. 16/456,206, filed Jun. 28, 2019, entitled: Apparatuses and Methods Involving Synchronization Using Data in the Data/Address Field of a Communications Protocol. The Examiner is referred to the copending patent prosecution of the common Applicant (no attachment).

U.S. Appl. No. 16/456,467, filed Jun. 28, 2019, entitled: Apparatuses and Methods Involving Selective Disablement of Side Effects Caused by Accessing Register Sets. The Examiner is referred to the copending patent prosecution of the common Applicant (no attachment).

U.S. Appl. No. 16/456,111, filed Jun. 28, 2019, entitled: Apparatuses and Methods Involving First Type of Transaction Registers Mapped to Second Type of Transaction Addresses. The Examiner is referred to the copending patent prosecution of he common Applicant (no attachment).

U.S. Appl. No. 16/456,236, filed Jun. 28, 2019, entitled: Apparatuses and Methods Involving a Segmented Source-Series Terminated Line Driver. The Examiner is referred to the copending patent prosecution of the common Applicant (no attachment).

Final Rejection for U.S. Appl. No. 16/456,111, 15 pgs., (dated Nov. 30, 2020).

Notice of Allowance for U.S. Appl. No. 16/456,236, 9 pgs. (dated Dec. 4, 2020).

Notice of Allowance for U.S. Appl. No. 16/456,467, 9 pgs. (dated Jan. 22, 2021).

Notice of Allowance for U.S. Appl. No. 16/456,111, 20 pgs. (dated Feb. 19, 2021).

* cited by examiner

APPARATUSES AND METHODS INVOLVING DISABLING ADDRESS POINTERS

OVERVIEW

Aspects of various embodiments are directed to apparatuses that disable address pointers in response to a reset of a logic node.

Local area networks (LANs) are a means by which many network modules or work stations are interconnected so as to share resources such as data and applications, providing considerable cost savings over, for example, a mainframe computer with multiple attached terminals, and providing other benefits as well. One widely accepted LAN arrangement is the so-called "Ethernet" LAN, which is defined by an industry compliant standard, namely, the Institute of Electrical and Electronic Engineer (IEEE) 802.3 standard. This standard allows network devices of various manufacturers, such as network interface cards (NICs), hubs, bridges, routers, and switches, to communicate packetized data with each other in the LAN. The IEEE 802.3 standard is defined in terms of the Open Systems Interconnection (OSI) reference model. This model defines a data communication system in terms of layers. Among the layers included in the OSI model are: (1) the physical layer (PHY), which specifies the electrical and coding characteristics of the transmission medium; (2) the medium access control (MAC) layer, which controls flow of data through the network; and (3) the network layer, which sets up connections between sources and destinations for data communicated in the network. Other layers include the transport layer, which is a protocol stack for transporting the data, and the application layer, such as a word-processor or spread sheet application.

These and other matters have presented challenges to efficiencies of logic node implementations, for a variety of applications.

SUMMARY

Various example embodiments are directed to issues such as those addressed above and/or others which may become apparent from the following disclosure concerning disabling address pointers in response to a reset of an address pointer in a logic node.

In certain example embodiments, aspects of the present disclosure involve disabling an address pointer for an indirect addressing transaction by a logic node, or portion of the logic node, that resets and while the master logic node is unaware of the reset.

In a more specific example embodiment, an apparatus is for use in a local area network (LAN) characterized by a plurality of network modules configured to convey data over a physical communication channel and with at least one of the network modules including a management communications bus for communication among a plurality of logic nodes via a communications protocol. The apparatus comprises at one of the plurality of logic nodes, a discernment logic circuit and logic circuitry. The discernment logic circuit discerns whether a requested communications transaction received over the management communications bus from another of the logic nodes involves a first type of transaction or a second type of transaction, the second type of transaction having a plurality of commands associated with the requested communications transaction to convey respectively different parts of the requested communications transaction including an address part and a data part. The logic circuitry disables, in response to a reset of an address pointer in the one of the plurality of logic nodes and the requested communications transaction being the second type of transaction, the address pointer to mitigate a likelihood that the requested communications transaction is performed via the communication protocol while the address pointer for the second type of transaction is erroneous.

The apparatus, in related and more specific embodiments, includes the management communications bus for communication among the plurality of logic nodes, wherein the plurality of logic nodes includes a master logic node and at least one slave logic node. The discernment logic circuit is part of the at least one slave logic node, and the at least one slave logic node is configured to act in response to receipt of the requested communications transaction only in response to the address pointer associated with the requested communications transaction being sent to the at least one slave logic node from the master logic node after the reset.

The logic circuitry, in various embodiments, mitigates a likelihood that the requested communications transaction is performed via the communication protocol while the other of the plurality of logic nodes is unaware of a possibility that the address pointer for the second type of transaction is erroneous due to the reset. For example, the logic circuitry initializes, in response to a reset of an address pointer in the one of the plurality of logic nodes, the address pointer for the second type of transaction by assigning the address pointer to an innocuous value to mitigate a likelihood that the requested communications transaction is performed via the communication protocol while the address pointer is erroneous. The logic circuitry may block, in response to a reset of the address pointer in the one of the plurality of logic nodes, use of the address pointer and assigns the address pointer to an innocuous value. In various embodiments, the logic circuitry blocks, in response to a reset of the address pointer in the one of the plurality of logic nodes, use of the address pointer without assigning the address pointer to an innocuous value. The logic circuitry may further flag, in response to a reset of the address pointer in the one of the plurality of logic nodes, the requested communications transaction for an interrupt occurrence.

In another specific example embodiment, an apparatus is for use in a LAN as described above and includes at one of the plurality of logic nodes, the discernment logic circuit and logic circuitry. The discernment logic circuit discerns whether a requested communications transaction received over the management communications bus from another of the plurality of logic nodes involves a first type of transaction or a second type of transaction, the second type of transaction having a plurality of commands associated with the requested communications transaction to convey respectively different parts of the requested communications transaction including an address part and a data part. The logic circuitry initializes, in response to a reset of the address pointer in one of the plurality of logic nodes and discerning the requested communications transaction is the second type of transaction, the address pointer by assigning the address pointer to an innocuous value to mitigate a likelihood that the requested communications transaction is performed via the communication protocol while the address pointer for the second type of transaction is erroneous. The apparatus may further include the management communications bus for communication among the plurality of logic nodes, wherein the innocuous value corresponds to a value which has no function for the at least one logic node.

In other specific example embodiments, the logic circuitry is to convey to the other of the plurality of logic nodes, in response to the address pointer being assigned to an innocuous value, an erroneous message attributable to the address pointer being assigned to an innocuous value. The erroneous message may include logging the transaction as failed, an interrupt mechanism, among other types of messages. The logic circuitry initializes the address pointer to mitigate a likelihood that the requested communications transaction is performed via the communications protocol while the other of the plurality of logic nodes is unaware of a possibility that the address pointer for the second type of transaction is erroneous due the reset.

In various related embodiments, the apparatus includes the plurality of logic nodes, the plurality of logic nodes including a master logic node and at least one slave logic node, and wherein the discernment logic circuit is part of the at least one slave logic node. The at least one slave logic node determines that the address pointer for the requested communications transaction has been reset and not sent to the at least one slave logic node from the master logic node, and in response, initializes the address pointer by assigning the address pointer to an innocuous value.

The innocuous value corresponds to one or more registers in the one of the plurality of logic nodes, and the logic circuitry, and in response to the initialization, logs the requested communications transaction as a failed data transaction. For example, the innocuous value corresponds to one or more registers in the one of the plurality of logic nodes that is not used by the one of the plurality of logic nodes for functional operations or that has no register associated with the innocuous value.

A number of embodiments are directed to methods of using the above-described apparatuses, such as methods for use in a LAN. An example method includes communicating over the management communication bus among the plurality of logic nodes. At one of the plurality of logic nodes, the method further includes discerning whether a requested communications transaction received over the management communication bus from another of the plurality of logic nodes involves a first type of transaction or a second type of transaction. The second type of transaction hays a plurality of commands to convey respectively different parts of the requested communications transaction including an address part and a data part. The method further includes disabling, in response to a reset of an address pointer in the one of the plurality of logic nodes, use of the address pointer for the second type of transaction to mitigate a likelihood that the requested communications transaction is performed while the other of the plurality of logic nodes is unaware of a possibility that the address pointer is erroneous. In various embodiments, the method includes initializing, in response to the reset of the address pointer in the one of the plurality of logic nodes, the address pointer for the second type of transaction and which includes assigning the address pointer to an innocuous value to mitigate a likelihood that the requested communications transaction is performed while the address pointer is erroneous. In various embodiments, in response to the address pointer being communicated to the one of the plurality of logic nodes from a master logic node of the plurality of logic nodes (e.g., being set), the method further includes activating use of the address pointer. The method may further flagging the requested communications transaction for an interrupt occurrence.

The above discussion/summary is not intended to describe each embodiment or every implementation of the present disclosure. The figures and detailed description that follow also exemplify various embodiments.

BRIEF DESCRIPTION OF FIGURES

Various example embodiments may be more completely understood in consideration of the following detailed description in connection with the accompanying drawings, in which.

Figure 1:
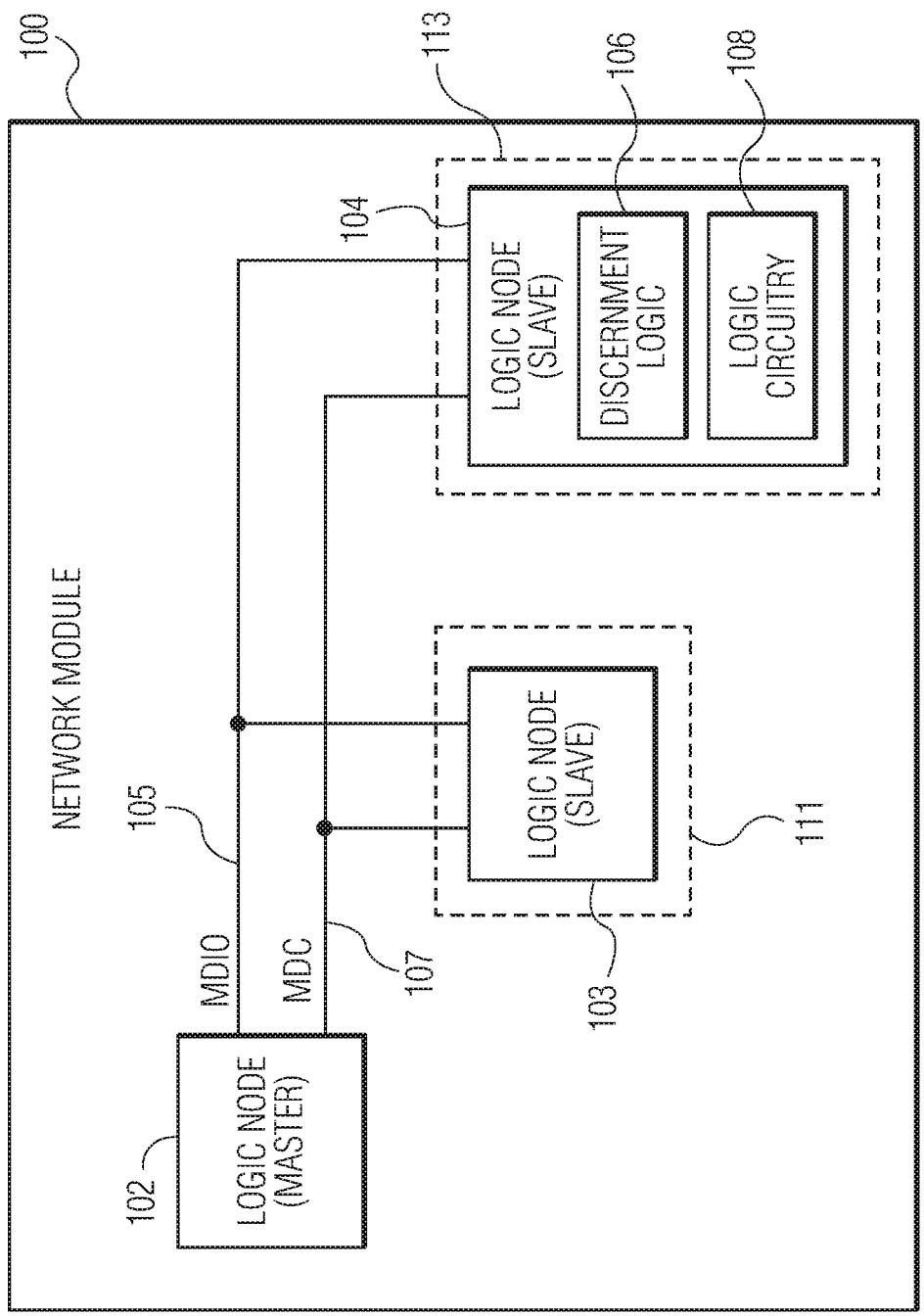
FIG. 1 illustrates an example apparatus, in accordance with the present disclosure.

While various embodiments discussed herein are amenable to modifications and alternative forms, aspects thereof have been shown by way of example in the drawings and will be described in detail. It should be understood, however, that the intention is not to limit the disclosure to the particular embodiments described. On the contrary, the intention is to cover all modifications, equivalents, and alternatives falling within the scope of the disclosure including aspects defined in the claims. In addition, the term "example" as used throughout this application is only by way of illustration, and not limitation.

DETAILED DESCRIPTION

Aspects of the present disclosure are believed to be applicable to a variety of different types of apparatuses, systems and methods involving disabling address pointers in response to a reset of the address pointer in a logic node. In certain example embodiments, aspects of the present disclosure involve a slave logic node that, in response to a reset of an address pointer in the slave logic node, disables an address pointer for indirect addressing transaction while the master logic node is unaware of the reset. While not necessarily so limited, various aspects may be appreciated through the following discussion of non-limiting examples which use exemplary contexts.

Accordingly, in the following description various specific details are set forth to describe specific examples presented herein. It should be apparent to one skilled in the art, however, that one or more other examples and/or variations of these examples may be practiced without all the specific details given below. In other instances, well known features have not been described in detail so as not to obscure the description of the examples herein. For ease of illustration, the same reference numerals may be used in different diagrams to refer to the same elements or additional instances of the same element. Also, although aspects and features may in some cases be described in individual figures, it will be appreciated that features from one figure or embodiment can be combined with features of another figure or embodiment even though the combination is not explicitly shown or explicitly described as a combination.

Various local area networks (LANs) allow network devices of manufacturers, such as network interface cards (NICs), hubs, bridges, routers, and switches, to communicate packetized data with each other in the LAN. Systems, sub-systems, or functions in a system of the LAN may be managed via registers using a register interface, to access these registers (e.g., via SMI as further described herein). This applies, for example, to Ethernet physical layer devices, sometimes referred to as "PHYs" or Ethernet PHY sub-systems that are managed via a serial management interface (SMI). The SMI can support different types of transactions that include indirect addressing, direct addressing, or both. The communications include access to memory, e.g., registers, in PHYs connected to the LAN which may be in network modules of the LAN. The PHYs may use a register map for configuration, control, and status readout of associated registers. The PHYs are located on or include logic nodes. Inside network modules (e.g., network modules of the LANs) there may be two types of logic nodes, a master logic node and slave logic nodes each coupled to a management communications bus. The master logic node manages access to the management communications bus and initiates the communications with the slave logic nodes over the management communications bus using a communications protocol. The slave logic nodes have an internal bus to couple internal PHYs and communicate over the management communications bus, with each slave logic node including one or more PHYs or subsystems. Each PHY has a corresponding port address such that each PHY is separately addressable. The communications protocol may allow for the different types of transactions communicated over the management communications bus. One type of transaction involves indirect addressing in which two commands per transaction are used to access an arbitrary register(s) (and, optionally, with the next register being ready with one command using an address increment), the first including the register address and the second including the data to write or read. Another type of transaction involves direct addressing in which the register address is included in the management frame field for the transaction. For indirect addressing, if the address for a management data input/output-managed device (MMD) or a PHY as selected by an address command, herein generally referred to as the "address pointer," is reset without the master logic node being aware, the master logic node may assume the previously selected address is applicable, when it is erroneous due to the reset. The transaction may be implemented to the wrong address, resulting in corrupt register content. Embodiments in accordance with the present disclosure are directed to apparatuses that block using the address pointer, in response to a reset of the address pointer in the logic node, to mitigate a likelihood that a requested communications transaction is performed while the address pointer for the indirect addressing is erroneous. For example, the address pointer for the indirect addressing may not match the address pointer assumed by the master logic node.

In accordance with various embodiments, blocking may include a variety of different types of actions. For example, blocking may include blocking the transaction (e.g., not acting) until the address pointer is set by a master logic node, initializing the address pointer to an innocuous value, and/or flagging the communications transaction for an interrupt occurrence. Initializing the address pointer to an innocuous value may result in the communications transaction (addressed to this value) having no impact on the operation of the device. Transactions to the initialized address and/or transaction that are ignored may be flagged for the master logic node. For example, a communications transaction that is blocked may be flagged to the master logic node to indicate that the communications transaction failed and that master logic node is to select the desired address for the communications transaction. In response to the indication of the failure, the master logic node sets the address pointer before communicating any or another communications transaction associated with the address pointer and for each slave logic node or portion of the slave logic node(s) that may have been reset.

In various instances, a particular slave logic node, or portion thereof, may be reset or powered up, or wakes-up from a sleep. As may be appreciated, each slave logic node may include multiple PHYs and subsystems (e.g., MMDs). The reset may be associated with the entire logic node or portions thereof, such as one or more PHYs or one or more MMDs. Embodiments in accordance with the present disclosure are directed to an apparatus for use in a LAN. The apparatus includes at one of the plurality of logic nodes, a discernment logic circuit and logic circuitry. The discernment logic circuit discerns whether a requested communications transaction received over the management communications bus from another of the logic nodes involves a first type of transaction or a second type of transaction, the second type of transaction having a plurality of commands associated with the requested communications transaction to convey respectively different parts of the requested communications transaction including an address part and a data part. The logic circuitry disables, in response to a reset of an address pointer in the one of the plurality of logic nodes and the requested communications transaction being the second type of transaction, the address pointer to mitigate a likelihood that the requested communications transaction is performed via the communication protocol while the address pointer for the second type of transaction is erroneous.

The logic circuitry, in various embodiments, mitigates a likelihood that the requested communications transaction is performed via the communication protocol while the other of the plurality of logic nodes is unaware of a possibility that the address pointer for the second type of transaction is erroneous due to the reset. For example, the logic circuitry may assign the address pointer to an innocuous value. In various embodiments, in response to a reset in the one of the plurality of logic nodes, logic circuitry blocks use of the corresponding address pointers until the address pointers have been set again by the master logic node. This can be, but is not always, combined with assigning the address pointer to an innocuous value. A communications transaction using an address pointer in a logic node that has the innocuous value, may trigger an interrupt to the master logic node.

In various embodiments, the communications protocol is in accordance with IEEE 802.3. The IEEE 802.3 specification defines two PHY register maps, one for each of Clause 22 and Clause 45. There is a register map defined in IEEE 802.3 Clause 22 for generations of Ethernet PHYs which contains up to thirty-two registers that are directly accessed via the management communications bus (e.g., management data input/output (MDIO)) (e.g., one of the (thirty two) registers may be used for indirect accessing). There is another register map defined in IEEE 802.3 Clause 45 that is used for generations of Ethernet PHYs. This register map provides a larger register space than for Clause 22, which is sub-divided over multiple MDIO-managed devices (MMDs). Accessing the registers of these different Clauses requires different MDIO commands. For example, an MDIO access method for Clause 45 registers involves indirect addressing, which uses different MDIO commands than the access of Clause 22 registers which involves direct addressing. Both register maps include an IEEE-defined register address space and a vendor-specific register address space. Registers in the vendor-specific space can be assigned by the device manufacturer. Although the above describes an application for Ethernet SMI, embodiments can be applied to other applications.

Turning now to the figures, FIG. 1 illustrates an example apparatus, in accordance with the present disclosure. The apparatus is for use in a LAN that is characterized by a plurality of network modules that convey data over a physical communication channel, such as media-independent interface connections connecting the network modules. Network modules consisting of multiple devices may include a management communications bus for communication among a plurality of logic nodes within the network module via a communications protocol. Although one or more of the network modules of the LAN may not have a management communication bus, such as single device network modules. The communications protocol is compliant with an industry standard that defines an Ethernet-based LAN technology, such as IEEE 802.3. The apparatus, as shown by FIG. 1, may include or be associated with one of the plurality of network modules and/or one of the logic nodes 102, 103, 104.

As shown, the network module 100 includes a plurality of logic nodes 102, 103, 104 and a management communication bus 105, 107 for communication among the plurality of logic nodes 102, 103, 104 in response to communications sent over the management communications bus 105, 107. The management communications bus 105, 107 includes two lines, a clock line and data line, respectively referred to as the management data clock (MDC) 107 and the MDIO 105. MDC 107 provides a full-rate clock signal from the master logic node 102 to the slave logic nodes 103, 104 to drive and slice bits on MDIO 105 during frames. The clock signal may stop during an idle state or cycle. MDIO 105 is a bi-directional bus with a tri-state driver in each logic node 102, 103, 104 and restive pull-up on the bus. The management communications bus 107, 105 allows for addressing the logic nodes 102, 103, 104 by conveying node addresses (e.g., port and register addresses) over the management communications bus 105, 107 using direct or indirect addressing, as further described herein. Various apparatus embodiments are directed to one of the logic nodes 102, 103, 104 (such as the master logic node 102 or one of the slave logic nodes 103, 104), more than one of the logic nodes, and/or the network module 100.

In a number of embodiments, two different types of logic nodes are connected to the management communications bus 105, 107, namely, slave logic nodes 103, 104 and a master logic node 102. The master logic node 102 generates the clock and initiates communications with the slave logic nodes 103, 104. The slave logic nodes 103, 104 receive the clock and respond when addressed by the master logic node 102. Although a single master logic node 102 and two slave logic nodes 103, 104 are illustrated, embodiments are not so limited and can include additional logic nodes or fewer logic nodes. The master logic node 102 is typically a microcontroller and is called a station management entity (STA) in the IEEE specification. The slave logic nodes 103, 104 are typically Ethernet PHYs, however SMI may also be used to manage other types of devices. In some network modules, such as with SMI, there is one master logic node and one more slave logic nodes. However, embodiments are not so limited and other types of modules may include more than one master logic node and/or may not include master/slaves.

In a number of embodiments, the logic nodes may be devices or form part of a device 111, 113, such as a network-module device. A network-module device, as used herein, refers to or includes a device having MDIO connections to internal logic nodes (or a node) of the plurality of logic nodes of the network module. Each device 111, 113 may include one logic node or multiple logic nodes, with each logic node having one PHY, multiple PHYs and/or multiple subsystems. Although the slave logic nodes 103, 104 are illustrated on separate devices 111, 113 and the master logic node 102 is not illustrated on a device, embodiments are not so limited. For example, the master logic node 102 may be on the same device 111, 113 as the one slave logic nodes 103, 104. Further, the slave logic nodes 103, 104 may be on the same device, and not separate devices.

One or more of the plurality of logic nodes 102, 103, 104 may include a PHY or multiple PHYs that connect to the data link layer, such as the medium access control (MAC) layer via a media independent interface (Mil). A PHY may be a chip, which may include one or multiple PHYs. Larger chips may contain one or more PHY subsystems, each including one or more PHYs. A PHY includes or refers to an individual chip or circuit, as a part of a circuit assembly, or a subsystem (e.g., circuit) of a device (e.g., an SMI slave device having multiple PHYs, such as an IC). The PHYs are configured to implement physical layer functions. Each PHY has its own port address, and, in some embodiments, multiple PHYs are integrated into one device and/or a slave logic node (and/or, optionally, with multiple logic nodes on a device) having one shared SMI interface. Each PHY includes a physical coding sublayer (PCS), a physical media attachment layer (PMA) and/or a physical media dependent layer (PMD), as well as a media-dependent interface (MDI) that connects to the media (e.g., cable). The PMD is an interface between the PMA and the transmission medium through the MDI. The PMD receives serialized bits from the PMA and converts to the appropriate signals for the transmission medium (such as optical signals for a fiber optic line or electrical signals for a copper line), and vice versa. When transmitted to the PMA, the PCS encodes the data to be transmitted into the appropriate code group. When receiving the code groups from the PMA, the PCS decodes the code groups into the data format that can be understood and processed by upper layers. The MII carries signals between the physical layer and the data link layer, such as to a MAC controller. The MII may include a reduced media-independent interface (RMII), gigabit media independent interface (GMT), a reduced gigabit media independent interface (RGMII), serial gigabit media-independent interface (SGMII), quad serial gigabit media-independent interface (QSGMII), and 10-gigabit media-independent interface (XGMH), among others.

The logic nodes 102, 103, 104 (e.g., the PHYs internal to the logic nodes) may include registers associated with different types of transactions. The different types of transactions are both compliant with the same communications protocol, and include different types of addressing and corresponding commands. For example, the first type of transaction includes direct addressing and the second type of transaction includes indirect addressing. For direct addressing, the addresses (e.g., the port address and register address) are included in the command with the instruction for the transaction. For indirect addressing, the address (e.g., the register address) is held in an intermediate location that is looked up for the instruction for the transaction. In specific embodiments, the direct addressing includes one command that has the address and the data parts. For indirect addressing, two commands are used, with the first including the address part (e.g., register address) and the second including the data part. The first type (e.g., Clause 22) of transaction may provide access to up to N registers in each of the M logic nodes, wherein N and M are positive integers, and the second type of transaction (e.g., Clause 45) may provide access to a plurality of registers in each of the one of the M logic nodes that is greater than N.

For indirect addressing, as described above, an address register is accessed to set the address pointers, and which uses separate transactions for setting the address and accessing the data at that address. A write address transaction writes the desired address value in or as an address pointer, which determines the selected address for the communications transaction(s). A master logic node 102 may perform multiple transactions to the same register, once the right address is set, as the address pointer is kept until it is overwritten by a new value. The master logic node 102 may utilize this process to reduce the number of address transactions. In the case of Ethernet PHYs, access of the Clause 45 register map via SMI implies indirect addressing. A Clause 45 register map may consist of multiple MMDs, and each MMD requires its own address pointer. The DEVAD (e.g., MMD) field is part of Clause 45 data frames, so if the address pointers of each MMD is set, the master logic node 102 may switch between MMDs and do data transactions to the registers selected by the address pointers in slave logic nodes 103, 104 without additional address transactions. The address pointers, in specific embodiments, are stored per PHY and per MMD. In some specific embodiments, each PHY includes three to four MMDs and the address pointers are stored in the gate-power domain.

One or more of the slave logic nodes 103, 104 may block an address pointer in response to a reset of the address pointer in the slave logic node 103, 104, and as associated with a second type of transaction (e.g., indirect addressing). A reset may occur due to local reset events, a power failure, or due to power-cycling of the logic supply during a sleep-wake up cycle. As an example, the logic node 104 includes discernment logic circuit 106 and logic circuitry 108. Although the logic node 104 is illustrated by FIG. 1 as a slave logic node, embodiments are not so limited and the discernment logic circuit and logic circuitry can form part of and/or be located on more than one of the logic nodes 102, 103, 104, such as part of a network-module device having multiple logic nodes.

The discernment logic circuit 106 discerns whether a requested communications transaction received over the management communications bus 105, 107 from another of the plurality of logic nodes involves the first type of transaction or the second type of transaction, with the second type of transaction having a plurality of commands associated with the requested communications transaction to convey different parts of the requested communications transaction including an address part and a data part. In specific embodiments, the logic node 104 supports both the first and second type of transactions, although embodiments are not so limited.

The logic circuitry 108, in response to a reset of the address pointer in the one of the plurality of logic nodes (e.g., the logic node 104) and the transaction including the second type of transaction, disables the address pointer for the second type of transaction to mitigate a likelihood that the requested communications transaction is performed while the address pointer for the second type of transaction is erroneous. For example, the logic circuitry 108 disables the use of the address pointer to mitigate a likelihood that the requested communications transaction is performed while the other of the plurality of logic nodes, e.g., the master logic node 102, is unaware of a possibility that the address pointer (or many address pointers) for the second type of transaction is erroneous due to the reset.

There may be multiple different address pointers for a respective slave logic node and as associated with indirect addressing, such as Clause 45 transactions. For example, there may be an address pointer per port address (e.g., per PHY) and per MMD. In some specific examples, more than one address pointer in a logic node may be erroneous at a given time. As described above, a reset associated with a logic node may be the entire logic node or portions thereof, such as PHY or MMD-level. As further described below, disabling use of the one or more address pointers may include only acting in response to receipt of requested communications transactions (e.g., performing the operation communicated in the communications transaction) in response to the address pointer being sent to the logic node 104 from the master logic node 102 after the reset of the address pointer. If the address pointer is reset, such as an MMD address pointer in response to the MMD being reset, the address pointer is reset to an innocuous value. In other embodiments, the address pointer is not reset, and the logic node 104 tracks if the address pointer is set after the reset (e.g., logs the transaction and/or address pointer). If the logic node 104 is tracking the address pointer, this may involve a bit per PHY and MMD to log the validity of the address pointers. In various embodiments, the logic node 104 conveys an error message, such as triggering interrupt occurrence or logging the transaction as failed which may occur with or without resetting the address pointer to the innocuous value.

As such and in specific embodiments, the logic circuitry 108 initializes, in response to the reset of the logic node 104 or a portion thereof, the address pointer for the second type of transaction by assigning the address pointer (or multiple address pointers) to an innocuous value to mitigate a likelihood that the requested communications transaction is performed via the communication protocol while the address pointer for the second type of transaction is erroneous. For example, the logic circuitry 108 may initialize an address pointer upon reset to a dedicated address, denoted as "innocuous value," which has no function other than to detect communications transactions after an address pointer reset and before the master logic node has set the address pointer to another value. In such embodiments, the innocuous value corresponds to one or more registers in the one of the plurality of logic nodes 104 that is not used by the one of the plurality of logic nodes 104 for functional operations or that has no register associated with the innocuous value. The innocuous value may correspond to a value which has no function for the one logic node 104, such as a reserved address, without a register behind it. In other embodiments, the innocuous value corresponds to one or more registers in the logic node 104. The logic circuitry 108, in response to the initialization, may log the requested communications transaction as a failed data transaction.

Communications transactions may not occur if the address pointer contains the innocuous address. For example, the logic circuitry 108 may convey an erroneous message to the other of the plurality of logic nodes (e.g., the master logic node 102), in response to the address pointer being assigned to the innocuous value. The erroneous message is associated with or indicates that the address pointer is assigned to an innocuous value. In such embodiments, a communications transaction having the innocuous value may be flagged to the master logic node 102 to indicate that the communications transaction failed and that the master logic node 102 is to select the desired address for the communications transaction. This flagging may, for example, be accomplished using an interrupt mechanism. For example, the logic circuitry 108 flags, in response to a reset of the one of the plurality of logic nodes 104 or portions thereof, the requested communications transaction for an interrupt occurrence. In various embodiments, the interrupt includes a local trigger wired-OR signal inside the network module 100 to notify the master logic node 102 that something happened in a slave logic node 103, 104. The master logic node 102 reads-out what happened in which slave logic node via the communications management bus 105, 107. Typically, the slave logic nodes may not take initiative for transactions on SMI, but with an interrupt the nodes can accomplish this indirectly.

In other related embodiments and/or in addition, the logic node 104 blocks the communications transaction involving the second type of transaction in response to the corresponding address pointer being reset and the master logic node 102 not sending a communications transaction to select the address pointer after the reset. A communications transaction that is blocked may be flagged to the master logic node 102 to indicate that the communications transaction failed and that master logic node 102 is to select the desired address pointer for the data transaction, and which may occur with or without initializing the address pointer to the innocuous value.

In various embodiments, the above can be combined by initializing the address pointer upon reset to an innocuous value, and blocking communications transactions if the address pointer for the second type of transaction contains the innocuous value. Furthermore, the logic node 104 may be configured to trigger an interrupt when any event occurs that resets address pointers in the logic node 104. As previously described, the master logic node 102 may be unaware of a possibility or a likelihood that one or more address pointers for the indirect addressing are erroneous due to the reset. The logic circuitry 108 initializing the one or more address pointers for the second type of transaction to mitigate a likelihood that the requested communications transaction is performed via the communication protocol, such as by preventing the communications transaction and/or triggering the flag to the master logic node 102. The interrupt may be directly or indirectly used to indicate that the address pointer may have reset and may be erroneous. A reset may imply, to the master logic node 102, that the address pointer is erroneous or may be erroneous. The master logic node 102 responds to the interrupt by setting the address pointer of an MMD before communicating any or another communications transaction to the MMD and to each slave logic node 103, 104 or portion thereof that may have been reset. As described above, resets can happen at different levels of the logic node. The different levels may include the whole logic node and portions thereof that are associated with the PHYs, such as a whole PHY and sublayers of the PHYs (e.g., MMDs). Different sublayers of PHYs (e.g., MMDs) may be reset and the corresponding address pointer for the MMD is reset. Only transactions involving an address pointer that has been reset and that is not set yet after that (by the master logic node), are blocked. Transactions associated with address pointers in the logic node that have not reset, may continue normally.

In above-described embodiments, only communications transactions using indirect addressing are disabled and in response to an address pointer (or pointers) in the particular logic node being reset. Data transactions using indirect addressing to other logic nodes or portions thereof on the communications management bus 105, 107 which are do not involve address pointers that are reset can continue, and an address transaction to a particular logic node or portion thereof that is reset is also executed, as setting the address achieves getting out of the indirect access disabled state. Not all PHYs of a logic node or MMDs of a PHY may reset at a particular time, and only transactions to MMDs of port addresses for which the address pointer is reset are blocked. Further, the address pointers are only blocked until the master logic node writes an address to the respective MMD for the port address. For example, assume a slave logic node has multiple PHYs and each PHY has multiple MMDs. A first MMD in a first PHY of the slave logic node may reset, while the whole slave logic node and first PHY do not reset. In such an example, the slave logic node blocks the address pointer of the first MMD and does not block the address pointer for the first PHY or any other PHY or MMDs and in response to the address pointer being communicated to the one of the plurality of logic nodes from a master logic node of the plurality of logic nodes (e.g., being set), activate use of the address pointer. For example, assume a slave logic node has multiple PHYs and each PHY has multiple MMDs. A first MMD in a first PHY may reset, while the whole logic node and first PHY do not. In such an example, the logic node blocks the address pointer of the first MMD and does not block the address pointer for the first PHY or any other PHY or MMDs in the slave logic node. In response to the address pointer being communicated to the slave logic node from the master logic node of the plurality of logic nodes (e.g., being set), use of the address pointer is activated.

The apparatus may include the slave logic node 104, on its own, in some embodiments. In other embodiments, the apparatus includes the slave logic node 104 or a plurality of the slave logic nodes 103, 104 and the master logic node 102, with the discernment logic circuit 106 and logic circuitry 108 being part of the at least one slave logic node 104. In various embodiments, the at least one slave logic node 104 is to determine that the address pointer for the requested communications transaction (which includes indirect addressing) has been reset and not sent to the at least one slave logic node 104 from the master logic node 102 after the reset. In response, the slave logic node 104 initializes the address pointer (or multiple address pointers) for the second type of transaction by assigning the address pointer to an innocuous value.

Figure 2:
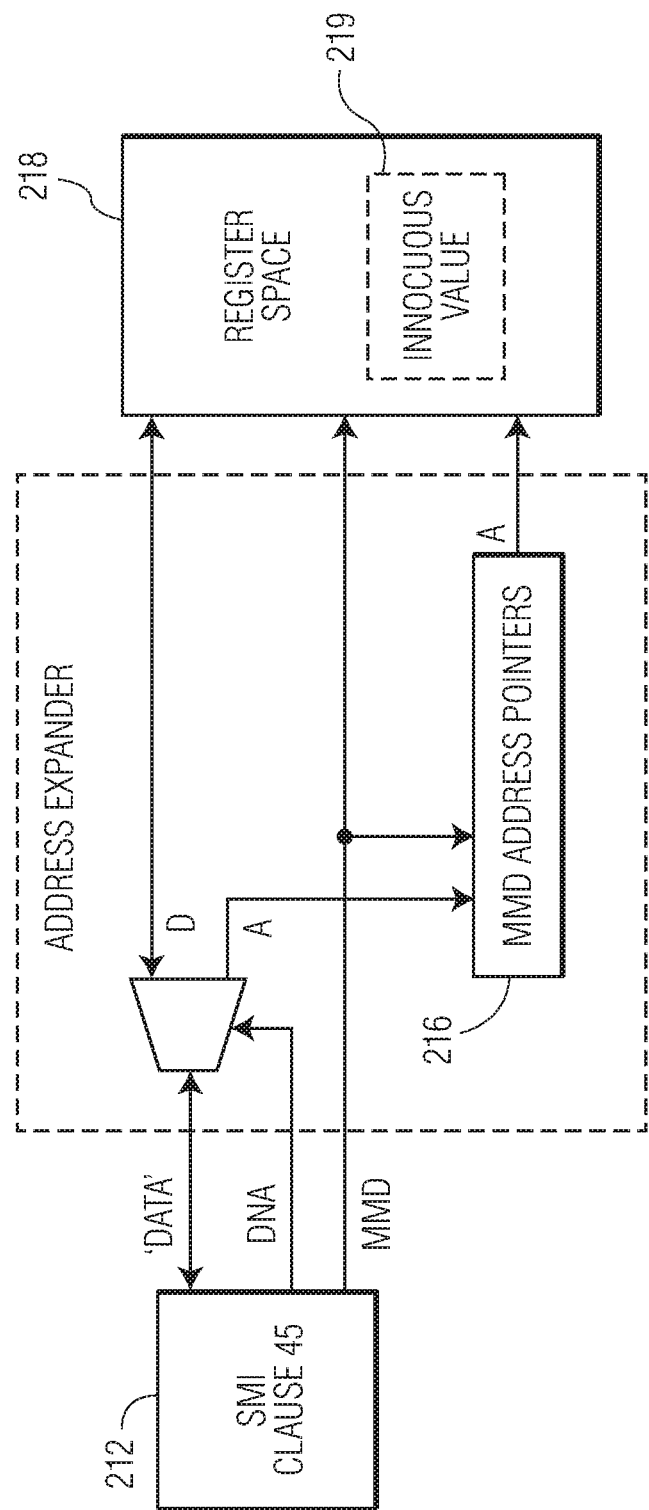
FIG. 2 illustrates example circuitry and commands for an apparatus, in accordance with the present disclosure.

FIG. 2 illustrates example circuitry and commands for an apparatus, in accordance with the present disclosure. The apparatus may be used for blocking communications transactions in response to a reset of the address pointer for the second type of transaction by disabling the address pointer, as described above. The second type of transaction may be associated with a communications protocol, such as Clause 45 data frames. The communications protocol, in a specific example is associated with Clause 45 data frames and/or with a communications protocol associated with Clause 22 data frames.

More specifically, FIG. 2 illustrates, for example, processing by the discernment logic circuit and the logic circuitry of a logic node, such as the logic node 104 illustrated by FIG. 1 and in response to a Clause 45 transaction. The logic node may discern whether the transaction is a Clause 22 or Clause 45 command, such as by using a SMI controller 212. The SMI controller 212, which may include or be the previously described discernment logic circuit and logic circuitry, discerns whether the requested communications transaction is a Clause 45 transaction involving indirect addressing. In response to a Clause 45 transaction, the SMI controller 212 (via the address expander) determines whether the command includes the address part or the data part. If the command includes the address part, the register address is stored in the address register 216 as an address pointer. If the command includes the data part, the previously stored address pointer is used to access a register in the register space 218 that is uniquely identified by the address pointer, and to either write data to the register or read data from the register. The SMI controller 212 illustrated by FIG. 2 may be internal to the slave logic node (e.g., is a function internal to the slave logic node) that translates SMI transactions to internal register transactions. There may be one SMI controller per device, such as per slave logic node or per network-module device, in some specific embodiments.

The logic node may identify that a reset has occurred for the logic node or a portion thereof which may indicate one or more address pointers are erroneous, are likely erroneous and/or do not match the address pointer assumed by the master logic node. In response to the address pointer reset, the logic node disables the address pointer for the indirect addressing to mitigate a likelihood that the requested communications transaction is performed via the communication protocol while the address pointer for the indirect addressing is erroneous. In a number of embodiments, the master logic node is unaware of a likelihood or probability of one or more address pointers being erroneous. In specific embodiments, blocking may include initiating an innocuous value. The innocuous value is assigned within the address register 216 and corresponds to an innocuous value register 219 (e.g., an address in the register space 218). The innocuous value register 219 may correspond to a value which has no function for the respective logic node (e.g., no actual register exists) or corresponds to one or more registers in the logic node. For example, the logic node may log the requested communications transaction as a failed data transaction, which may optionally be logged in the one or more registers. In other embodiments, the value corresponds to one or more registers in the logic node that are not used by the logic node for functional operations or that has no register associated with the innocuous value. In response to assigning the innocuous value and/or the reset address pointer, the logic node may convey an erroneous message, such an interrupt to the master logic node that triggers the master logic node to communicate one or more address pointers, as previously described.

As previously described, Clause 22 transactions involve direct addressing. The frame fields in the data frames include:

PRE: a preamble frame field which is "1" for thirty-two clock cycles

ST: start-of-frame, which is fixed to "01"

OP: operation code which identifies read or write operation (with 10 including read and 01 including write)

PHYAD: a five bit (PHY) port address

REGAD: a five bit register address

TA: turn-around (hand over for read and filler for writes)

DATA: sixteen bit register value (e.g., data).

In contrast, Clause 45 transactions involve indirect addressing. Four example data frames for Clause 45 transaction include a first for an address part of a read or write transaction, a second for a read operation, a third for a write operation, and a fourth for post-read increment addressing in accordance with Clause 45 of IEEE 802.3. The frame fields in the data frame include:

PRE: a preamble frame field which is "1" for thirty-two clock cycles

ST: start-of-frame, which is fixed to "00"

OP: operation code which identifies address, read or write operation (with 00 being write an address, 10 including read, 01 including write, and 11 including read and increment address)

PRTAD: a five bit (PHY) port address

DEVAD: a five bit MDIO-manage device (MMD) number

DATA: sixteen bit address or register value (e.g., data)

The ST identifies whether the transaction is Clause 22 or Clause 45. For a Clause 45 transaction, the address is not included in the data/write commands. The address can be addressed per MMD and is set by a separate (address) command. The data read/write operations are directed to this address. The address space for Clause 45 is sixteen bit wide (e.g., 65536 registers).

The above-described apparatus may be used to implement a variety of methods. An example method is used within a LAN characterized by a plurality of network modules configured to convey data over a physical communication channel and with at least one of the network modules including a management communications bus for communication among a plurality of logic nodes via a communications protocol. The method includes communicating over the management communication bus among the plurality of logic nodes. The method further includes, at one of the plurality of logic nodes, discerning whether a requested communications transaction received over the management communications bus from another of the plurality of logic nodes involves a first type of transaction or a second type of transaction. The second type of transaction has a plurality of commands associated with the requested communications transaction to convey respectively different parts of the requested communications transaction including an address part and a data part. The method further includes disabling, in response to a reset of an address pointer in the one of the plurality of logic nodes and the transaction being the second type of transaction, the address pointer for the second type of transaction to mitigate a likelihood that the requested communications transaction is performed via the communication protocol while the other of the plurality of logic nodes is unaware of a possibility that the address pointer for the second type of transaction is erroneous, such as one or more address pointers for the indirect addressing.

Various embodiments are implemented in accordance with the underlying U.S. Patent Application (application Ser. No. 16/456,111 entitled "Apparatuses and Methods Involving First Type of Transaction Registers Mapped to Second Type of Transaction Addresses," filed Jun. 28, 2019, which is fully incorporated herein by reference for its general and specific teachings. For instance, embodiments herein and/or in the provisional application may be combined in varying degrees (including wholly). As a specific example, the above-described apparatuses and/or methods may include first type of transaction registers that are mapped to the second type of transaction addresses, such as illustrated by FIGS. 2A-2B and 4. Embodiments discussed in the Patent Application are not intended, in any way, to be limiting to the overall technical disclosure, or to any part of the claimed disclosure unless specifically noted.

Terms to exemplify orientation, such as upper/lower, left/right, top/bottom and above/below, may be used herein to refer to relative positions of elements as shown in the figures. It should be understood that the terminology is used for notational convenience only and that in actual use the disclosed structures may be oriented different from the orientation shown in the figures. Thus, the terms should not be construed in a limiting manner.

The skilled artisan would recognize that various terminology as used in the Specification (including claims) connote a plain meaning in the art unless otherwise indicated. As examples, the Specification describes and/or illustrates aspects useful for implementing the claimed disclosure by way of various circuits or circuitry which may be illustrated as or using terms such as blocks, modules, device, system, unit, controller, and/or other circuit-type depictions (e.g., reference numerals 106, 108, 212 of FIGS. 1 and 2A-2B depict a block/module as described herein). Such circuits or circuitry are used together with other elements to exemplify how certain embodiments may be carried out in the form or structures, steps, functions, operations, activities, etc. For example, in certain of the above-discussed embodiments, one or more modules are discrete logic circuits or programmable logic circuits configured and arranged for implementing these operations/activities, as may be carried out in the approaches shown herein. In certain embodiments, such a programmable circuit is one or more computer circuits, including memory circuitry for storing and accessing a program to be executed as a set (or sets) of instructions (and/or to be used as configuration data to define how the programmable circuit is to perform), and an algorithm or process as described herein is used by the programmable circuit to perform the related steps, functions, operations, activities, etc. Depending on the application, the instructions (and/or configuration data) can be configured for implementation in logic circuitry, with the instructions (whether characterized in the form of object code, firmware or software) stored in and accessible from a memory (circuit).

Based upon the above discussion and illustrations, those skilled in the art will readily recognize that various modifications and changes may be made to the various embodiments without strictly following the exemplary embodiments and applications illustrated and described herein. For example, methods as exemplified in the Figures may involve steps carried out in various orders, with one or more aspects of the embodiments herein retained, or may involve fewer or more steps. For instance, any of the apparatuses illustrated may be used to implement the above-described method. Such modifications do not depart from the true spirit and scope of various aspects of the disclosure, including aspects set forth in the claims.

What is claimed is:

1. An apparatus for a local area network characterized by a plurality of network modules configured to convey data over a physical communication channel and with at least one of the network modules including a management communications bus for communication among a plurality of logic nodes, the apparatus comprising at one of plurality of logic nodes;
    a discernment logic circuit to discern whether a requested communications transaction received over the management communications bus from another of the plurality of logic nodes involves a first type of transaction or a second type of transaction, the second type of transaction having a plurality of commands associated with the requested communications transaction to convey respectively different parts of the requested communications transaction including an address part and a data part; and
    logic circuitry to disable, in response to a reset of an address pointer in the one of the plurality of logic nodes and the requested communications transaction being the second type of transaction, use of the address pointer to mitigate that the requested communications transaction is performed via a communication protocol while the address pointer for the second type of transaction is erroneous due to the reset.

2. The apparatus of claim 1, the apparatus further including the management communications bus for communication among the plurality of logic nodes and the plurality of logic nodes, wherein the plurality of logic nodes include a master logic node and at least one slave logic node, and wherein the logic circuitry is part of the at least one slave logic node, and wherein the at least one slave logic node is to act in response to receipt of the requested communications transaction only in response to the address pointer associated with the requested communications transaction being sent to the at least one slave logic node from the master logic node after the reset.

3. The apparatus of claim 1, wherein the logic circuitry is further to mitigate a that the requested communications transaction is performed via the communication protocol while the other of the plurality of logic nodes is unaware of a possibility that the address pointer for the second type of transaction is erroneous due to a reset of the logic node or a portion thereof.

4. The apparatus of claim 1, wherein the logic circuitry is further to initialize, in response to a reset of the one of the plurality of logic nodes, the address pointer for the second type of transaction by assigning the address pointer to an innocuous value to mitigate that the requested communications transaction is performed via the communication protocol while one or more address pointers are erroneous due to the reset.

5. The apparatus of claim 1, wherein the logic circuitry is further to block, in response to the reset of the address pointer in one of the plurality of logic nodes, use of the address pointer without assigning the address pointer to an innocuous value.

6. The apparatus of claim 1, wherein the logic circuitry is further to block, in response to the reset of the address pointer in one of the plurality of logic nodes, use of the address pointer and to assign the address pointer to an innocuous value.

7. The apparatus of claim 1, wherein the logic circuitry is further to flag, in response to the reset of the address pointer in one of the plurality of logic nodes.

8. The apparatus of claim 1, is further to flag, in response to the reset of the address pointer in one of the plurality of logic nodes, the requested communications transaction for an interrupt occurrence.

9. The apparatus of claim 1, wherein an innocuous value corresponds to one or more registers in the one of the plurality of logic nodes, and the logic circuitry, in response to initialization, logs the requested communications transaction as a failed data transaction.

10. An apparatus for a local area network characterized by a plurality of network modules configured to convey data over a physical communication channel and with at least one of the network modules including a management communications bus for communication among a plurality of logic nodes via a communications protocol, the apparatus comprising at one of the plurality of logic nodes;
    a discernment logic circuit to discern whether a requested communications transaction received over the management communications bus from another of the plurality of logic nodes involves a first type of transaction or a second type of transaction, the second type of transaction having a plurality of commands associated with the requested communications transaction to convey respectively different parts of the requested communications transaction including an address part and a data part; and
    logic circuitry to initialize, in response to a reset of an address pointer in the one of the plurality of logic nodes and discerning that the requested communications transaction is the second type of transaction, an address pointer by assigning the address pointer to an innocuous value to mitigate a that the requested communications transaction is performed via the communication protocol while the address pointer for the second type of transaction is erroneous due to the reset.

11. The apparatus of claim 10, the apparatus further including the management communications bus for communication among the plurality of logic nodes, wherein the innocuous value corresponds to a value which has no function for the one logic node.

12. The apparatus of claim 10, wherein the logic circuitry is to convey to the other of the plurality of logic nodes, in response to the address pointer being assigned to an innocuous value, an erroneous message attributable to the address pointer being assigned to an innocuous value.

13. The apparatus of claim 10, wherein the logic circuitry is further to initialize the address pointer to mitigate a that the requested communications transaction is performed via the communication protocol while the other of the plurality of logic nodes are unaware of a possibility that the address pointer for the second type of transaction is erroneous due to the reset.

14. The apparatus of claim 10, further including the plurality of logic nodes, the plurality of logic nodes including a master logic node and at least one slave logic node, and wherein the discernment logic circuit is part of the at least one slave logic node, and wherein the at least one slave logic node is to determine that the address pointer for the requested communications transaction has been reset and not sent to the at least one slave logic node from the master logic node.

15. The apparatus of claim 10, wherein the innocuous value corresponds to one or more registers in the one of the plurality of logic nodes, and the logic circuitry, in response to the initialization, logs the requested communications transaction as a failed data transaction.

16. The apparatus of claim 10, wherein the innocuous value corresponds to a register in the one of the plurality of logic nodes that is not used by the one of the plurality of logic nodes for functional operations or that has no register associated with the innocuous value.

17. The apparatus of claim 10, wherein the each of the first and second types of transactions are compliant with an industry standard that defines an Ethernet-based local-area network (LAN) technology.

18. A method for use within a local area network characterized by a plurality of network modules configured to convey data over a physical communication channel and with at least one of the network modules including a management communications bus for communication among a plurality of logic nodes via a communications protocol, the method comprising:
communicating over the management communication bus among the plurality of logic nodes; and
at one of the plurality of logic nodes:
  discerning whether a requested communications transaction received over the management communication bus from another of the plurality of logic nodes involves a first type of transaction or a second type of transaction, the second type of transaction having a plurality of commands associated with the requested communications transaction to convey respectively different parts of the requested communications transaction including an address part and a data part; and
  disabling, in response to a reset of an address pointer in the one of the plurality of logic nodes, use of said address pointer for the second type of transaction to mitigate that the requested communications transaction is performed via the communication protocol while the other of the plurality of logic nodes is unaware of a possibility that the address pointer is erroneous due to the reset.

19. The method of claim 18, wherein disabling use of the address pointer for the second type of transaction includes initializing and assigning the address pointer to an innocuous value to mitigate that the requested communications transaction is performed via the communication protocol while the address pointer is erroneous, and in response to the address pointer being communicated to the one of the plurality of logic nodes from a master logic node of the plurality of logic nodes, activating use of the address pointer.

20. The method of claim 18, wherein disabling use of the address pointer for the second type of transaction includes flagging the requested communications transaction for an interrupt occurrence.

* * * * *